July 26, 1966   E. V. ZARETSKY ETAL   3,262,186
METHOD OF IMPROVING THE RELIABILITY
OF A ROLLING ELEMENT SYSTEM
Filed Feb. 8, 1965                         2 Sheets-Sheet 1

INVENTORS
ERWIN V. ZARETSKY
RICHARD J. PARKER
WILLIAM J. ANDERSON

BY

ATTORNEYS

July 26, 1966

E. V. ZARETSKY ET AL 3,262,186

METHOD OF IMPROVING THE RELIABILITY
OF A ROLLING ELEMENT SYSTEM

Filed Feb. 8, 1965

INVENTORS
ERWIN V. ZARETSKY
RICHARD J. PARKER
WILLIAM J. ANDERSON

BY

Gene E. Shook

ATTORNEYS

United States Patent Office
3,262,186
Patented July 26, 1966

3,262,186
METHOD OF IMPROVING THE RELIABILITY OF A ROLLING ELEMENT SYSTEM
Erwin V. Zaretsky, Shaker Heights, Richard J. Parker, North Ridgeville, and William J. Anderson, North Olmsted, Ohio, assignors to the United States of America as represented by the Administrator of the National Aeronautics and Space Administration
Filed Feb. 8, 1965, Ser. No. 431,235
11 Claims. (Cl. 29—148.4)

The invention described herein may be manufactured and used by or for the Government of the United States of America for governmental purposes without the payment of any royalties thereon or therefor.

This invention is concerned with rolling-element systems and, more particularly, with a method of improving the load capacity and fatigue life of such systems.

In rocket and missile applications where high reliability is desirable, it becomes necessary for certain component parts, such as rolling-element bearings and gears, to have increased load capacity and fatigue life. A mode of failure for these rolling elements is from pitting fatigue or spalling characterized by material removal from the contact surfaces causing a pit limited in depth and area. The cause of this failure is a fatigue phenomena and results from shearing stresses below the rolling contact surfaces which are a function of contact stress.

Material hardness plays an important role in determining rolling-element fatigue, and fatigue life as well as load capacity increases with increasing hardness. It has additionally been shown that resistance to material plastic deformation increases with increasing hardness, and it is concluded that a correlation exists between fatigue life and resistance to plastic deformation. Material hardness or resistance to plastic deformation has a two-fold effect on fatigue life and load capacity; as material hardness is lowered, fatigue life decreases because of an inherent reduction in material strength, but at the same time resistance to deformation is reduced and consequently the contact stress decreases. The latter effect would increase fatigue life, and the two effects are acting in opposition to each other. Additionally, residual compressive stresses are developed below the rolling-contact surfaces, the magnitudes of which appear to be a function of time and material hardness. These residual compressive stresses can act in opposition to the subsurface shearing stresses which cause fatigue failure.

It is, therefore, an object of the present invention to provide an improved rolling-element system.

Another object of the invention is to provide a method of improving the fatigue life and load capacity of rolling-element bearings.

Still another object of the invention is to provide a method of improving the load capacity and fatigue life of a gear mechanism.

Briefly, these and other objects of the invention are obtained by heat treating all elements in a rolling-element system to substantially the same hardness, and then tempering those elements subjected to the greater number of stress cycles one to two points Rockwell C hardness less than the other elements which engage them. By using the method of the invention, the optimum combination of material hardness and induced compressive residual stress is obtained thereby improving the fatigue life and load capacity of the rolling-element system.

In an alternate embodiment of the invention the elements receiving the greater number of stress cycles are heat treated to a Rockwell C hardness one to two points less than the other elements in combined rolling and sliding contact with them.

A more complete appreciation of the invention and many of the attendant advantages thereof will be readily apparent as the same becomes better understood by reference to the following detailed description when considered in conjunction with the accompanying drawings wherein.

Figure 1:
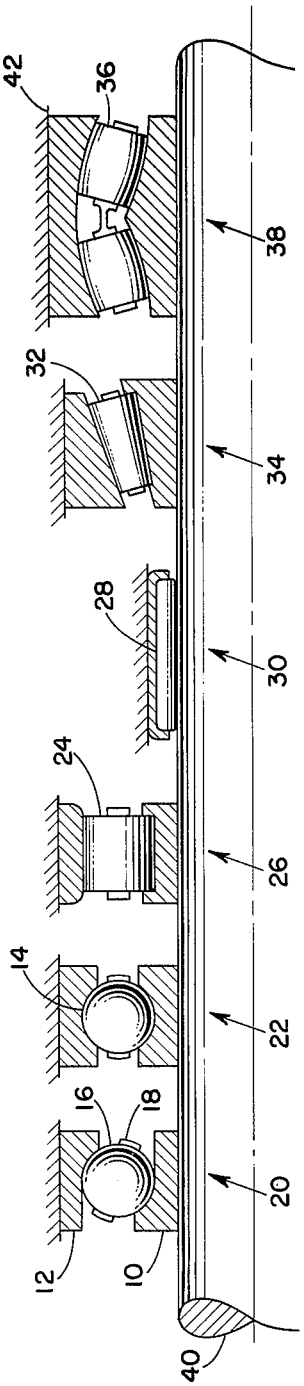
FIG. 1 is a vertical section of several types of rolling-element bearings made in accordance with the present invention.

In the manufacture of rolling-element bearings, such as those illustrated in FIG. 1, blanks of hardenable high carbon chromium steel, such as SAE 52100, are fabricated into ring shape blanks. These blanks are heat treated to a Rockwell C hardness of 58 or greater which is the acceptable hardness for bearings because no brinelling of such hardened material will generally take place under normal operating bearing loads. The ring blanks are then ground to specified dimensions to form an inner race 10 and an outer race 12 having honed race grooves 14.

A plurality of rolling elements 16 are fabricated to mate with the inner race 10 and outer race 12. The rolling elements 16 are located between the inner and outer races and are positioned by a separator or cage 18. The rolling elements 16 can be balls to form angular contact ball bearings 20 to accommodate radial and thrust loads or deep groove ball bearings 22 to take primarily radial loads. The rolling elements can be cylindrical rollers 24 to form roller bearings 26, needle shaped rollers 28 to form needle roller bearings 30, tapered rollers 32 to form tapered roller bearings 34, or crowned rollers 36 to form spherical roller bearings 38. A cage is not required for the needle roller bearing 30, and the inner race can be eliminated with the rollers 28 bearing directly on a rotating shaft 40. When a needle roller bearing 30 is used the shaft 40 is heat treated in accordance with the method of heat treating the inner race 10 of the bearing 20.

The balls of a ball bearing are usually formed by upsetting cylindrical blanks of hardenable high carbon chromium steel between two semi-hemispherical dies and rough grinding to form the required configuration. The resulting spherical blank is heat treated to a hardness approximately equal to the hardness of the inner and outer races. This Rockwell C hardness is usually in the range between 58 to 66. The balls are then finish ground and polished to a surface finish generally of two micro-inches or better for high quality bearings.

The various rollers of the roller type bearings are heat treated and finished in a similar manner. Cylindrical blanks are heat treated in substantially the same manner as the balls. The blanks are then ground and finished to the desired geometry and dimensions.

In the past, it was believed that, for maximum fatigue life and load capacity, the bearing races and rolling elements should have maximum hardness obtainable without producing metal brittleness. This would indicate that the bearing races and rolling elements should be approximately 66 Rockwell C hardness. However, for aircraft and missile applications it is necessary for the bearing operating temperature to be less than the tempering temperature necessary to obtain the bearing race and ball hardness. If the operating temperature was higher than the tempering temperature, the bearing material would be tempered and softened during operation resulting in dimensional instability of the material because of stress relief and phase changes which may occur during tempering. Consequently, the hardness of the bearings used for these applications is less than the maximum obtainable, and usually no greater than Rockwell C 63. Thus, maximum possible fatigue life, load capacity and reliability are not realized.

Subsequent to heat treating, the races and rolling elements are assembled whereby the rolling elements, such as the balls 16, are disposed between the inner race 10 and outer race 12 and positioned and retained by the cage 18. For the needle bearing 30, the shaft 40 acts as the bearing inner race, and no cage is used to separate the needle rollers 28. The shaft 40 is then inserted in the inner race 10 while the outer race 12 is inserted in a housing 42.

The method of the present invention comprises heat treating the inner and outer races as well as the ball blanks, all of which are made from a hardenable high carbon steel, to substantially the same hardness. This hardness need not be the maximum hardness obtainable for the material; however, it should be greater than Rockwell C 60. Subsequently, the inner and outer races are tempered to a Rockwell C hardness one to two points less than the hardness of the rolling elements. The race hardness can be selected on the basis of the ultimate bearing operating temperature, and the other component hardnesses are chosen accordingly. The rolling elements and the races are then ground to their desired geometries and surface finishes, and these elements are assembled according to the methods described above. Alternately, the races can be tempered to a Rockwell C hardness one to two points less than the rolling elements subsequent to being ground and finished, but prior to assembly.

In a modification of the aforesaid method the inner and outer race blanks are heat treated to a Rockwell C hardness preferably greater than 58. The rolling element blanks are heat treated to a Rockwell C hardness one to two points greater than the hardness of the race blanks. The component blanks are ground and finished as heretofore described. Subsequently, the components are assembled as previously described using conventional methods.

A point on the race of the bearing receives many more stress cycles than any point on the rolling elements, and the inner race receives a greater number of stress cycles than the outer race. Therefore, in principle, it is necessary that the element receiving the greater number of stress cycles be one to two points Rockwell C less than the contacting element receiving the lesser number of stress cycles to mechanically induce a greater magnitude of residual compressive stresses in the zone of resolved shearing stress in the component most likely to fail.

Figure 2:
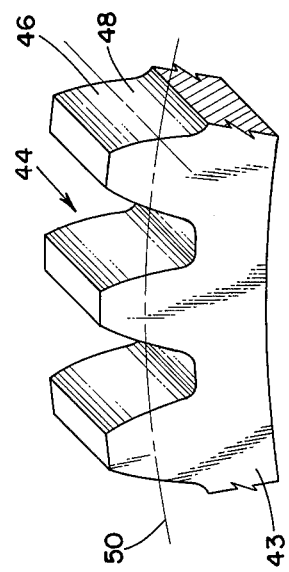
FIG. 2 is an enlarged perspective view of typical gear teeth used in certain rolling-element systems.

Referring to FIG. 2, there is shown a gear 43 comprising teeth 44, each having a face 46 and a flank 48 separated by a pitch circle 50. The kinematics of the gear teeth when in contact with the teeth of a mating gear or pinion in similar to rolling-element bearings inasmuch as there is combined rolling and sliding contact. Where in a bearing the velocity of sliding is constant, the magnitude of which is dependent upon bearing geometry and speed, the magnitude of sliding and rolling in a gear varies along the entire tooth contact. When the line of contact between teeth is between the face 46 and flank 48 at the pitch circle 50, the motion is equal to that of a roller bearing, such as bearing 26 in FIG. 1. As with rolling-element bearings, two or more gears in contact make up a rolling-element system.

In fabricating a gear, the teeth are rough cut in a blank that has been suitably prepared for machining by normalizing or annealing. The gear is then heat treated to the upper hardness limit for machining and the teeth are brought to final size by taking a finish cut. No subsequent heat treatment is normally done. Alternately, in standard practice, the gear can be heat treated subsequent to being rough cut to a maximum hardness depending upon the material used, then the gear teeth can be brought to size, and a smooth finish can be obtained by finish grinding. As with rolling-element bearings, to obtain maximum fatigue life for the gear system, the maximum hardness which can be practicably obtained can be specified.

Figure 3:
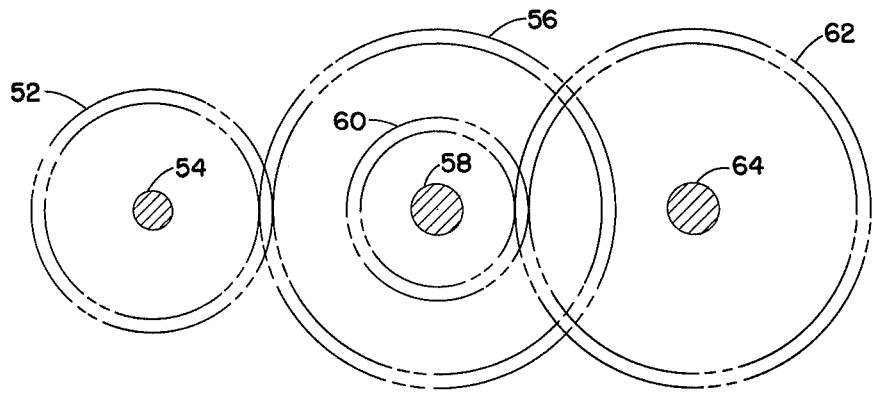
FIG. 3 is an elevation view of a gear train having components made in accordance with the invention.

Referring to FIG. 3, there is shown a gear train system comprising a gear 52 on a shaft 54 that is in contact with a second gear 56 on a shaft 58. Another gear 60 is mounted on the shaft 58, and a fourth gear 62 fastened to a shaft 64 engages the gear 60. The gear 52 has a smaller pitch diameter than gear 56, and the gear 60 has a smaller pitch diameter than the gear 62. Therefore, during system operation the gears 52 and 60 will receive greater numbers of stress cycles than their mating gears 56 and 62, respectively.

Prior to assembling the gear train system shown in FIG. 3, blanks for the gears 52, 56, 58, and 62 are annealed, and the teeth rough cut in the blank. The gears are then heat treated to the upper hardness limit for machining, and the teeth are brought to final size by taking a finish cut.

According to the present invention, gears 52 and 60 are then tempered to a Rockwell C hardness one to two points less than the hardness of gears 56 and 62. The gears are then assembled into the gear train system. Alternately, after rough cutting, the gears 52 and 60 are heat treated to the maximum hardness obtainable, which can be above Rockwell C 58 dependent upon the eventual operating temperature of the rolling-element system. Gears 56 and 62 are heat treated to a Rockwell C hardness one to two points more than gears 52 and 60. The gears are then finish ground to the specified dimensions and tolerances prior to assembly in the gear train system.

Figure 4:
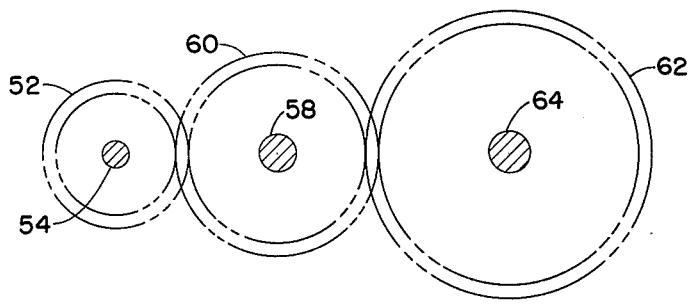
FIG. 4 is an elevation view of another gear train having components made in accordance with the invention.

In the gear train system shown in FIG. 4, the gear 52 mates with the gear 60 instead of the gear 56 in FIG. 3. In such a system using the method of the instant invention, the gear 52 would be tempered to a Rockwell C hardness one to two points less than that of the gear 60 which is tempered to a Rockwell C hardness one to two points less than that of the gear 62. Alternatively, gear 60 would be heat treated to a Rockwell C hardness one to two points greater than that of the gear 52, and gear 62 would be heat treated to a Rockwell C hardness one to two points greater than that of the gear 60. After heat treatment the gears would be assembled in the rolling-element system which, in this embodiment, is the gear train system.

If the system in FIGS. 3 and 4 are speed reducers, the gears 52 and 60 would be pinions. If, however, the systems are speed increasers, the gears 62 and 60 would be pinions. Regardless the gears receiving the greater number of stress cycles should be heat treated to a Rockwell C hardness one to two points less than the gears mated with them.

The following examples, which illustrate the methods and resulting advantages of the invention, have the following common specifications and conditions:

| | |
|---|---|
| Material | SAE 52100. |
| Contact angle | 30°. |
| Outer race conformity | 52%. |
| Ball diameter | ½ inch. |
| Spherical inner race diameter | ½ inch. |
| Thrust load, P | 340 lbs. |
| Speed | 10,000 r.p.m. |
| Outer race hardness | Rockwell C 63. |

The outer race was designed whereby the contact stress was much lower than the ball-inner race contact stress. Thus, no outer race failures would be expected to occur. The inner race and/or ball hardness was changed in each example according to the following heat treatment schedule.

| Rockwell C Hardness | Austenitized for for 30 minutes at— | Oil quenched °F. | First temper in oil | Second temper in oil |
|---|---|---|---|---|
| 60 | 1,550° to 1,600° F | 125 | 60 minutes at 250° F. | 60 minutes at 450° F. |
| 62 | do | 125 | do | 60 minutes at 350° F. |
| 63 | do | 125 | do | 60 minutes at 320° F. |
| 65 | do | 125 | do | 90 minutes at 250° F. |
| 66 | do | 125 | do | None. |

*Example I*

| Rockwell C Hardness | | Difference in hardness between balls and inner race Rockwell C, ΔH | 10-percent fatigue life, millions of inner race rev., L | Capacity, $C = P \sqrt[3]{L}$, lbs. |
|---|---|---|---|---|
| Inner race | Balls | | | |
| 60 | 60 | 0 | 2.1 | 435 |
| 60 | 62 | 2 | 5.8 | 610 |
| 60 | 63 | 3 | 2.7 | 475 |
| 60 | 65 | 5 | 3.2 | 500 |
| 60 | 66 | 6 | 3.3 | 520 |

In Example I the bearing fatigue life and load capacity is the highest where, in accordance with the invention, the rolling element is approximately two points Rockwell C hardness greater than the inner race, the element which is receiving the greater number of stress cycles during operation.

*Example II*

| Rockwell C Hardness | | Difference in hardness between balls and inner race Rockwell C, ΔH | 10-percent fatigue life, millions of inner race rev., L | Capacity, $C = P \sqrt[3]{L}$, lbs. |
|---|---|---|---|---|
| Inner race | Balls | | | |
| 63 | 60 | −3 | 0.4 | 250 |
| 63 | 62 | −1 | 1.4 | 390 |
| 63 | 63 | 0 | 2.6 | 470 |
| 63 | 65 | 2 | 4.7 | 570 |
| 63 | 66 | 3 | 1.2 | 360 |

As in Example I the maximum fatigue life and load capacity occurs at a ΔH equal to approximately two in accordance with the method of the instant invention.

*Example III*

| Rockwell C Hardness | | Difference in hardness between balls and inner race Rockwell C, ΔH | 10-percent fatigue life, millions of inner race rev., L | Capacity, $C = P \sqrt[3]{L}$, lbs. |
|---|---|---|---|---|
| Inner race | Balls | | | |
| 65 | 60 | −5 | 0.6 | 290 |
| 65 | 62 | −3 | 1.2 | 360 |
| 65 | 63 | −2 | 1.7 | 415 |
| 65 | 65 | 0 | 3.9 | 560 |
| 65 | 66 | 1 | 5.7 | 605 |

In this example the maximum fatigue life and load capacity occurs where ΔH is greater than one point Rockwell C hardness which is in accord with the method of the instant invention.

*Example IV*

207-size deep groove ball bearings like bearing 22 in FIG. 1 having ABEC 5 specifications were run to failure under the following conditions:

Material _____ SAE 52100.
Radial load, P _____ 1320 lbs.
Speed _____ 2750 r.p.m.

The balls and the races were heat treated according to the heat treatment schedule for Examples I to III. The following results were obtained:

| Rockwell C Hardness | | Difference in hardness between balls and inner race Rockwell C, ΔH | 10-percent fatigue life, millions of inner race rev., L | Capacity, $C = P \sqrt[3]{L}$, lbs. |
|---|---|---|---|---|
| Inner race | Balls | | | |
| 63 | 60 | −3 | 21 | 3,640 |
| 63 | 63 | 0 | 77 | 5,620 |
| 63 | 65 | 2 | 106 | 6,250 |
| 63 | 66 | 3 | 74 | 5,540 |

As in the previous examples, the maximum fatigue life and load capacity occur where ΔH is approximately two points Rockwell C.

Figure 5:
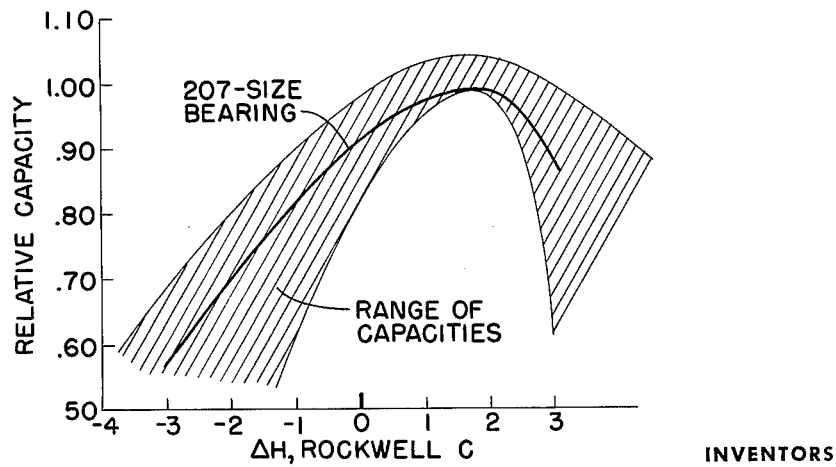
FIG. 5 is a graph illustrating the beneficial technical effect of the present invention.

Referring to the graph in FIG. 5, the range of relative capacities for Examples I to III are plotted as a function of ΔH which is shown by the shaded area. From this graph, in accordance with the instant invention, the maximum capacity and fatigue life occurs at a difference in hardness between the balls and the race, ΔH, of approximately one to two. The relative capacities for Example IV are also plotted and shown by the dark curve. The capacities are within the range of the previous examples. The maximum capacities for all examples are independent of the absolute hardness of the components and in accordance with the instant invention.

While the invention described herein is described in detail in its present embodiments, it will be obvious to those skilled in the art after understanding the invention that various changes and modifications may be made therein without departing from the spirit or the scope thereof. Further, it is apparent from the above description that various modifications in the specific materials and procedures described may be made within the scope of the invention.

What is claimed is:
1. In a method of making a rolling-element system having elements in rolling and sliding contact wherein one or more elements in contact receive a greater number of stress cycles during system operation than the other elements, the improvement comprising
   heat treating all elements to substantially the same hardness, and
   tempering the elements receiving the greater number of stress cycles to one to two points Rockwell C hardness less than the elements in contact therewith thereby improving the load carrying capacity and fatigue life of said rolling-element system.
2. In a method of making a rolling-element system having elements in rolling and sliding contact wherein one element in contact receives a greater number of stress cycles during system operation than the other elements, the improvement comprising
   heat treating the element receiving the greater number of stress cycles to a Rockwell C hardness between about 58 and about 64, and
   heat treating the other elements to a Rockwell C hardness of one to two points more than said element receiving the greater number of stress cycles thereby improving the load carrying capacity and fatigue life of said rolling-element system.
3. In a method of making a rolling-element bearing having an outer race, an inner race, and rolling elements disposed between and in contact with the inner and outer races and retained and positioned by a separator, the improvement comprising
   heat treating the races to a Rockwell C hardness greater than 58, and
   heat treating the rolling elements to a Rockwell C hardness one to two points greater than said races thereby improving the load carrying capacity and fatigue life of the rolling-element bearing.

4. A method of improving the load capacity and fatigue life of a bearing having a plurality of rolling elements disposed between and in contact with an inner race and an outer race comprising heat treating the rolling elements to a substantially high Rockwell C hardness, and heat treating the inner race to a Rockwell C hardness one to two points less than said substantially high hardness.

5. A method of increasing fatigue life and load capacity of a bearing as in claim 4, including heat treating a plurality of balls to a Rockwell C hardness of not less than 60.

6. A method of increasing fatigue life and load capacity of a bearing as in claim 4 including heat treating a plurality of cylindrical rollers to a Rockwell C hardness of not less than 60.

7. A method of increasing fatigue life and load capacity of a bearing as in claim 4, including heat treating a plurality of tapered rollers to a Rockwell C hardness of not less than 60.

8. A method of increasing fatigue life and load capacity of a bearing as in claim 4, including heat treating a plurality of crowned rollers to a Rockwell C hardness of not less than 60.

9. A method of improving the capacity and fatigue life of a gear mechanism having a first and a second gear of hardenable tool steel in rolling and sliding contact wherein the first gear receives a greater number of stress cycles than the second gear comprising the steps of heat treating the first and second gears to substantially the same hardness, tempering said first gear to a Rockwell C hardness one to two points less than said second gear, and assembling said gears in said mechanism.

10. A method of improving the load capacity and life of a speed increasive mechanism having contained therein pinions and gears of hardenable steel in rolling and sliding contact, the improvement comprising heat treating steel for a plurality of first blanks, forming gears from said first blanks, heat treating a plurality of second blanks to a Rockwell C hardness one to two points less than the hardness of said gears, forming pinions from said second blanks, and engaging in rolling and sliding contact said gears and pinions in said mechanism.

11. A method of improving the load capacity and life of a speed reducing mechanism having contained therein pinions and gears of hardenable steel in rolling and sliding contact, the improvement comprising heat treating the pinions and gears to substantially the same hardness, and tempering said gears to a Rockwell C hardness one to two points less than the hardness of said pinions.

References Cited by the Examiner

UNITED STATES PATENTS

| | | | |
|---|---|---|---|
| 2,259,324 | 10/1941 | Robinson | 29—148.4 |
| 2,685,545 | 8/1954 | Sindehand | 148—6 |
| 2,852,836 | 9/1958 | McNicoll | 29—148.4 |
| 3,004,322 | 10/1961 | Pitner | 29—148.4 |
| 3,141,230 | 7/1964 | Pohlar et al. | 29—148.4 |

JOHN F. CAMPBELL, *Primary Examiner.*

THOMAS H. EAGER, *Examiner.*